US007006734B2

(12) United States Patent
Zheng et al.

(10) Patent No.: US 7,006,734 B2
(45) Date of Patent: Feb. 28, 2006

(54) OPTICAL WAVEGUIDE Y-BRANCH SPLITTER

(75) Inventors: Jun-Fei Zheng, Palo Alto, CA (US); Christina Manolatou, Ithaca, NY (US); Kazumi Wada, Lexington, MA (US)

(73) Assignee: Intel Corporation, Santa Clara, CA (US)

(*) Notice: Subject to any disclaimer, the term of this patent is extended or adjusted under 35 U.S.C. 154(b) by 190 days.

(21) Appl. No.: 10/675,148

(22) Filed: Sep. 29, 2003

(65) Prior Publication Data

US 2005/0069258 A1 Mar. 31, 2005

(51) Int. Cl.
*G02B 6/26* (2006.01)

(52) U.S. Cl. .......................... 385/45; 385/14; 385/129; 385/130; 385/131; 385/132

(58) Field of Classification Search .................. 385/14, 385/42, 46, 45, 129, 130, 131, 27, 28, 132
See application file for complete search history.

(56) References Cited

U.S. PATENT DOCUMENTS

| | | | | |
|---|---|---|---|---|
| 5,745,619 | A * | 4/1998 | Li et al. | 385/48 |
| 5,799,119 | A * | 8/1998 | Rolland et al. | 385/28 |
| 6,236,784 | B1 * | 5/2001 | Ido | 385/45 |
| 6,553,164 | B1 * | 4/2003 | Ono et al. | 385/45 |
| 2004/0008944 | A1 * | 1/2004 | Johannessen et al. | 385/45 |

* cited by examiner

*Primary Examiner*—Brian M. Healy
(74) *Attorney, Agent, or Firm*—Blakely, Sokoloff, Taylor & Zafman LLP

(57) ABSTRACT

A method and apparatus for splitting/coupling optical signal(s). A unitary waveguide section having a first lateral dimension perpendicular to a propagation axis of the unitary section is provided. An offset waveguide section is optically coupled to the unitary waveguide section. The offset waveguide section has a second lateral dimension approximately equal to twice the first lateral dimension. Two branching waveguide sections having first ends are optically coupled to the offset section at the first ends.

27 Claims, 8 Drawing Sheets

OPTICAL WAVEGUIDE Y-BRANCH SPLITTER

TECHNICAL FIELD

This disclosure relates generally to optical splitters and couplers and, more specifically, to such structures having a Y-branch configuration.

BACKGROUND INFORMATION

The components used in optical networks are often complex structures, individually fabricated for specific applications of use. Though complex overall, many of these components are formed of relatively simple individual optical devices combined to achieve complex functionality. Just as the advent of semiconductor logic gates facilitated the creation of the microprocessor, the development of simple optical devices performing functions such as coupling, splitting, and constructive/destructive interference allows system designers to form increasingly complex optical circuits.

Of the various basic optical structures, signal splitting is one of the most important. Generally, signal splitting is achieved through either direct or indirect coupling techniques. Indirect coupling, for example, relies upon evanescent field coupling through two close proximity waveguides, one being a source waveguide. Direct coupling instead involves bringing an input waveguide (or propagating medium) in direct physical contact with one or more output waveguides. Y-branches and multimode interference ("MMI") couplers are two examples of direct coupling structures that can be used to split an optical signal.

Y-branches are the most common direct coupling structures for implementing an optical splitter. FIG. 1 is a block diagram illustrating a known Y-branch 100 for splitting an input optical signal 105 into two output optical signals 110A and 110B. Y-branch 100 includes an input section 115 (for receiving input optical signal 105) coupled to two branching sections 120A and 120B. Where branching sections 120A and 120B meet, a sharp inner edge, called a splitting point 125, is defined having a splitting angle $\phi$ greater than zero (typically much greater than zero). Branching sections 120A and 120B diverge from splitting point 125 with a radius of curvature $R_1$.

Y-branch 100 loses a sizeable amount of input energy due to a mode mismatch at the splitting point 125, which causes back reflections and radiation seepage and further due to limitations in device fabrication. Fabrication of Y-branch 100 is a lithographic process in which high-quality lithography equipment, such as E-beam lithography equipment is used. Even with such equipment, it is difficult to fabricate well-aligned and symmetric branching sections 120A and 120B defining a sharp and centered splitting point 125. These difficulties are compounded as optical devices continued to shrink in size. Even if perfect alignment of branching sections 120A and 120B and a well defined splitting point 125 were to be achieved in one device, reproducing such alignment and well defined feature across a batch of fabricated devices is not likely.

To avoid the high cost associated with high-quality lithography equipment, lower quality lithography techniques are generally used. Of course, there is a tradeoff between cost and quality. A poor quality inner edge at splitting point 125 results in power loss due to light spill out between branching sections 120A and 120B (see FIG. 5) and non-uniform split power ratios. For example, each branching section of a 50/50 Y-branch splitter may receive much less than the ideal 50% of the optical input power, and further, the optical input power that is coupled to each of the branching sections typically varies between the branching sections by 30%. These imperfections are compounded in applications such as a multi-fanout "H-Tree" where successive levels of Y-branches are coupled together. For example, where an optical power split non-uniformity of X% occurs on average due to fabrication imperfections, an optical device having N levels of Y-branches can result in N·X% non-uniformity after N levels of Y-branches. Thus, current fabrication imperfections can render entire optical devices inoperable.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of an apparatus and method for efficiently and uniformly splitting an input optical signal using a branching waveguide are described herein. In the following description numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. A "fundamental mode of propagation" of an optical signal is defined herein as a propagating optical wave having a transverse electric field with a profile having only a single peak. A "double mode of propagation" of an optical signal is defined herein as a propagating optical wave having a transverse electric field with a profile having two peaks. A "multimode optical signal" is defined herein as a propagating optical signal simultaneously having a fundamental mode of propagation and a double mode of propagation. A "single mode waveguide" is defined herein as a waveguide that supports propagation of only the fundamental mode of propagation. A "multimode waveguide" is defined herein as a waveguide that supports propagation of the fundamental mode and the double mode of propagation.

Figure 2:
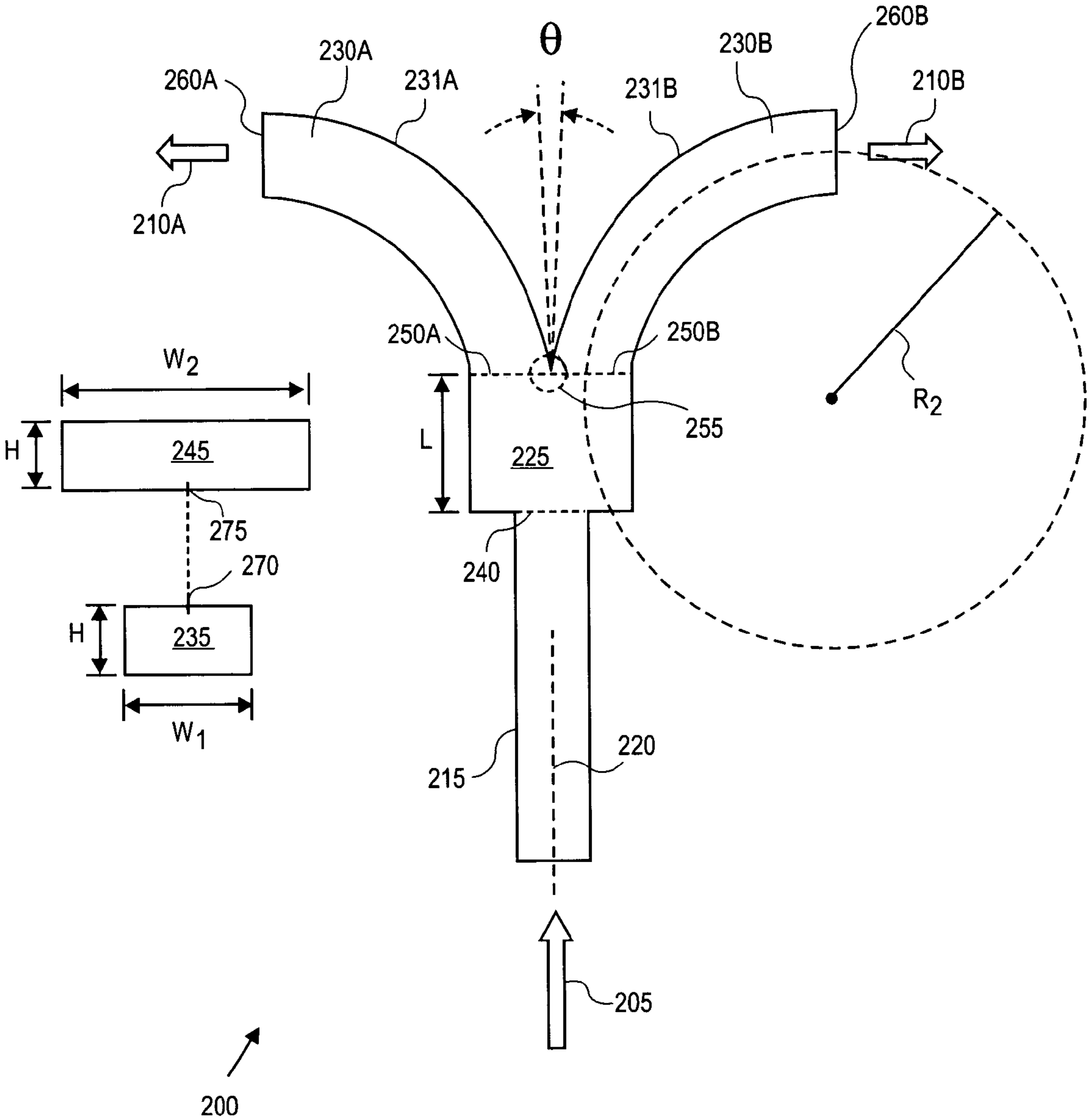
FIG. 2 is a block diagram illustrating a branching waveguide for efficiently and uniformly splitting an input optical signal, in accordance with an embodiment of the present invention.

FIG. 2 is a block diagram illustrating a branching waveguide 200 for efficiently and uniformly splitting an input optical signal 205 into output optical signals 210A and 210B, in accordance with an embodiment of the present invention. Although the present invention is described below in terms of its functionality as an optical splitter, one of ordinary skill in the art having the benefit of the present disclosure will recognize that the principles of operation described below may be applied in reverse to implement an optical coupler using embodiments of branching waveguide described herein.

The illustrated embodiment of branching waveguide 200 includes a unitary section 215 having a propagation axis 220, an offset section 225, and branching sections 230A and 230B. In one embodiment, branching waveguide 200 is a waveguide formed of an optically transparent material (e.g., a material having a low-loss at a desired communication wavelength like 1.31 μm or 1.55 μm) for guiding electromagnetic radiation (e.g., input optical signal 205) in one or more of the infrared, visible, or ultraviolet bands of the electromagnetic spectrum. Unitary section 215 is optically coupled in a suitable manner to receive input optical signal 205 and to guide input optical signal 205 along propagation axis 220.

In one embodiment, branching waveguide 200 is a planar structure, wherein unitary section 215, offset section 225, and branching sections 230A and 230B have rectangular cross sections for guiding input optical signal 205 and output optical signals 210A and 210B. As illustrated by cross-section 235, in one embodiment unitary section 215 has a lateral dimension $W_1$ and a height H. Lateral dimension $W_1$ and height H are dimensions perpendicular to propagation axis 220. Lateral dimension $W_1$ and height H are such that unitary section 215 is a single-mode waveguide constraining input optical signal 205 to a single fundamental mode of propagation.

Unitary section 215 is optically coupled to offset section 225 at an interface 240. As illustrated by cross-section 245, offset section 225 has a lateral dimension $W_2$ and a height H. Lateral dimension $W_2$ is selected to be approximately twice the width of lateral dimension $W_1$ of unitary section 215. As such, lateral dimension $W_2$ does not constrain input optical signal 205 to the single fundamental mode; but rather, allows input optical signal 205 to expand laterally to support higher-order modes. In one embodiment, lateral dimension $W_2$ is designed to support a second order mode (a.k.a. double mode). Ideally, input optical signal 205 only propagates in the double mode within offset section 225; however, offset section 225 may also support multimode propagation of input optical signal 205 wherein both the fundamental mode and the double mode propagate together. Offset section 225 has a length L, which is long enough to allow input optical signal 205 to expand from the single mode propagation to include the double mode propagation. In one embodiment, length L can approach nearly zero.

In one embodiment, lateral dimension $W_1$ of unitary section 215 is approximately 2.4 μm and lateral dimension $W_2$ of offset section 225 is 4.8 μm. In one embodiment, height H is 1 μm. In one embodiment, length L is 10 to 20 μm. In the illustrated embodiment, a center 270 of unitary section 215 is aligned with a center 275 of offset section 225. Therefore, offset section 225 protrudes out on either side approximately $W_1/2$ (i.e., one half of lateral dimension $W_1$) past unitary section 215. It should be appreciated that center 270 need not be perfectly aligned with center 275 to achieve acceptable uniformity in the optical power split ratio. Therefore, in some embodiments, center 270 is not aligned with center 275. It should be appreciated that other dimensions may be used and may vary dependent upon the wavelength of input optical signal 205.

In the illustrated embodiment, the transition between lateral dimension $W_1$ of unitary section 215 to lateral dimension $W_2$ of offset section 225 at interface 240 is abrupt. However, other embodiments of the present invention include the transition at interface 240 as gradual. For example, unitary section 215 may taper out from lateral dimension $W_1$ to lateral dimension $W_2$ at interface 240. In one embodiment, the transition tapers out with an angle of 45 degrees. In general, the taper should be steep enough to effectively excite double mode propagation of input optical signal 205 (e.g., greater than 15 degrees). However, it should be appreciated that the type of taper, whether curved or straight, may be adjusted as desired. Similarly, in the abrupt transition embodiment, the fidelity of the abrupt transition is not crucial.

Branching sections 230A and 230B are optically coupled to offset section 225 at first ends 250A and 250B, respectively. Initially, at first ends 250A and 250B where branching sections 230A and 230B interface with offset section 225, branching sections 230A and 230B run parallel to each other and diverge therefrom. Thus, at a splitting point 255, waveguide walls 231A and 231B of branching sections 230A and 230B, respectively, share a common tangent. A splitting angle θ at splitting point 255 is approximately zero degrees. Of course, FIG. 2 illustrates an ideal embodiment of branching waveguide 200, where as fabrication limitations may limit splitting angle θ to merely approaching zero degrees and may limit waveguide walls 231A and 231B to approximately sharing a common tangent at first ends 250A and 250B. However, this is only a practical lithography resolution limitation and can be improved as lithography technology advances.

In the illustrated embodiment, branching sections 230A and 230B diverge away from each other towards second ends 260A and 260B of branching sections 230A and 230B, respectively, with a radius of curvature $R_2$. In other embodiments, branching sections 230A and 230B need not have a constant radius of curvature between first ends 250A and 250B and second ends 260A and 260B. Rather, the curvature of branching sections 230A and 230B may vary along their lengths and even form an S-shape or follow any other desired path.

In the illustrated embodiment, branching sections 230A and 230B are symmetrical about propagation axis 220, having identical radius of curvatures $R_2$ or branch bending characteristics. The symmetric configuration forms a 50/50 optical splitter, splitting input optical signal 205 into output optical signals 210A and 210B having approximately equal power/intensity (practically achieve approximately 49:51 split power ratio).

Figure 3:
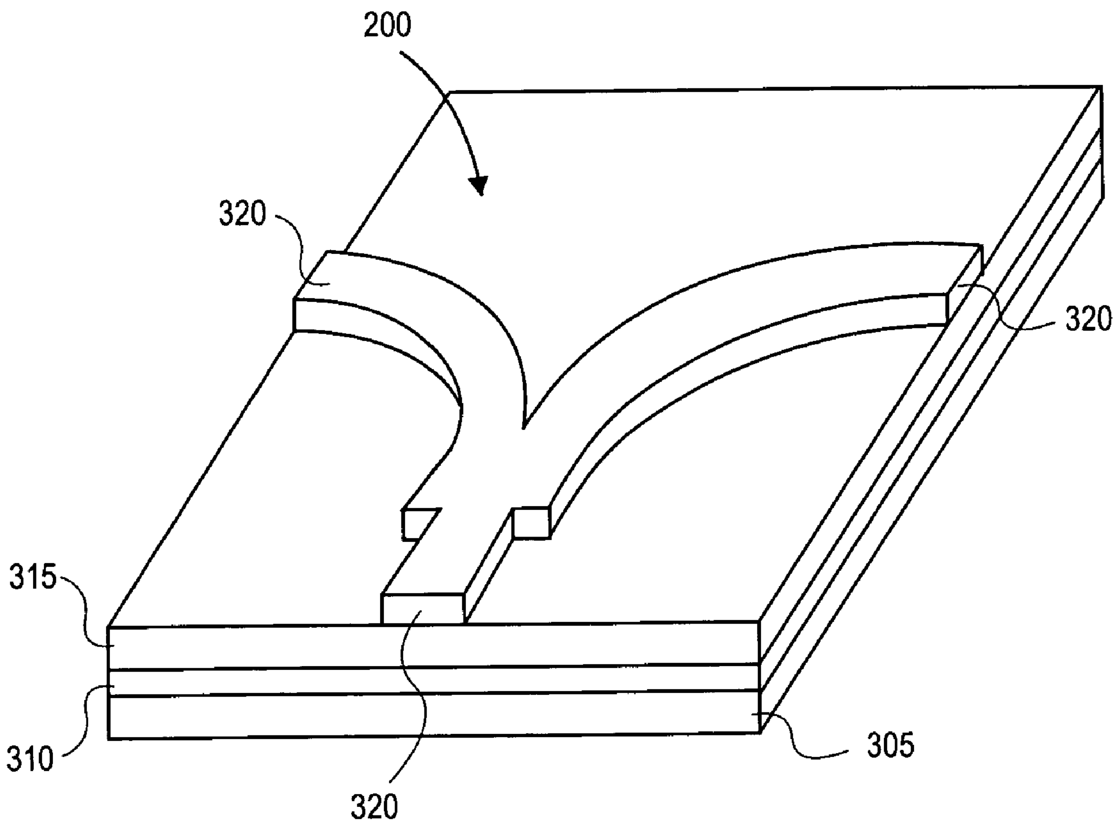
FIG. 3 is an isometric view of a branching waveguide for efficiently and uniformly splitting an input optical signal formed on a substrate, in accordance with an embodiment of the present invention.

FIG. 3 is an isometric view of branching waveguide 200 formed on a substrate layer 305 midway through a fabrication process, in accordance with an embodiment of the present invention. Known materials may be used to form branching waveguide 200 described herein. In one embodiment, branching waveguide 200 is a silicon-on-insulator SOI structure.

To fabricate embodiments of branching waveguide 200, substrate layer 305 is formed, for example by supplying a silicon wafer. A buffer layer 310 is deposited or grown on top of substrate layer 305. Suitable silicon oxides well known to persons of ordinary skill in the art may be used to form buffer layer 310. A semiconductor material layer 315, such as intrinsic or doped silicon, is formed over buffer layer 310. Semiconductor material layer 315 is patterned and etched away, using lithography techniques, to define branching waveguide 200 formed above buffer layer 310, having a Y-branch pattern. The top and side surfaces of branching waveguide 200 may remain exposed or be covered with subsequent material layer having a lower index of refraction (e.g., silicon oxide). Due to the lower index of refraction of the material on the outer surfaces of branching waveguide 200 and the lower index of refraction of buffer layer 310, mode confinement is achieved substantially within region 320, extending through branching waveguide 200. As will be appreciated, these fabrication processes may be used to batch fabricate multiple branching waveguides 200.

Other materials may be used in place of a SOI structure. For example, materials that offer high contrast index of refraction interfaces across different dopants (e.g., Silicon Oxynitride, known doped III–V semiconductor materials including Indium Phosphide ("InP"), and heavily Ge-doped Silica, polymers, and the like) may be used.

Figure 4C:
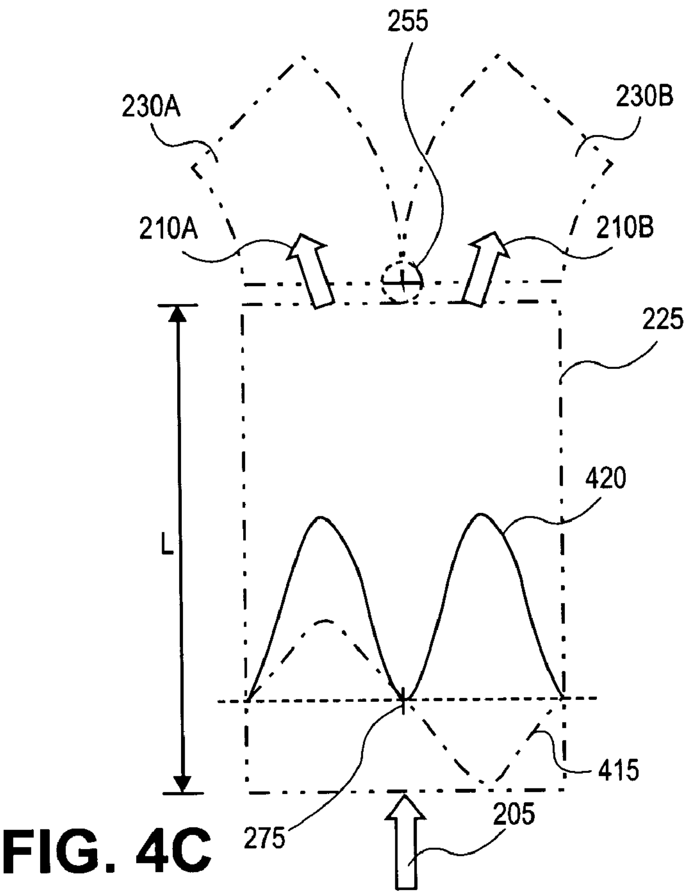
FIG. 4C is a diagram illustrating propagation of an input optical signal along an offset section of a branching waveguide, in accordance with an embodiment of the present invention.
Figure 4D:
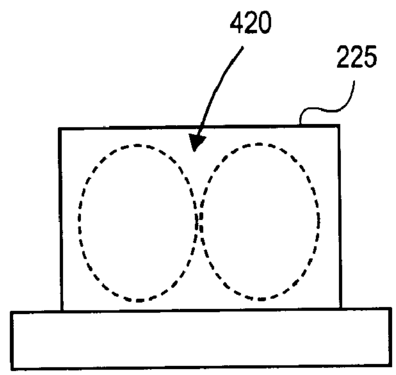
FIG. 4D is a cross-sectional diagram of an offset section of a branching waveguide illustrating an intensity distribution of an input optical signal propagating along the offset section, in accordance with an embodiment of the present invention.
Figure 4A:
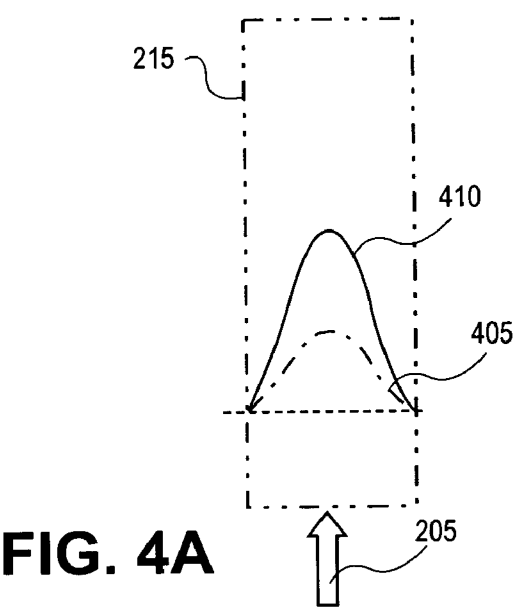
FIG. 4A is a diagram illustrating propagation of an input optical signal along a unitary section of a branching waveguide, in accordance with an embodiment of the present invention.

FIG. 4A is a diagram illustrating propagation of input optical signal 205 along unitary section 215 of branching waveguide 200, in accordance with an embodiment of the present invention. As illustrated, unitary section 215 constrains an electric field ("E-field") 405 of input optical signal 205 to single-mode propagation (e.g., excitation of the fundamental mode only). A mode or optical mode refers to a specific solution of the wave equation (equation 1 below) that satisfies appropriate boundary conditions and has the property that its spatial distribution does not change with propagation. The fundamental mode of E-field 405 is one solution of the following equation, $$\nabla^2 \tilde{E} + n^2(\omega) k_o^2 \tilde{E} = 0 \quad \text{(Equation 1)}$$

where $\tilde{E}$ is the Fourier transform of the electric field vector, n is the index of refraction, ω is the angular frequency of the electric field, and k is the free-space wave number. An intensity distribution 410, which is proportional to the square of E-field 405, is also illustrated.

Figure 4B:
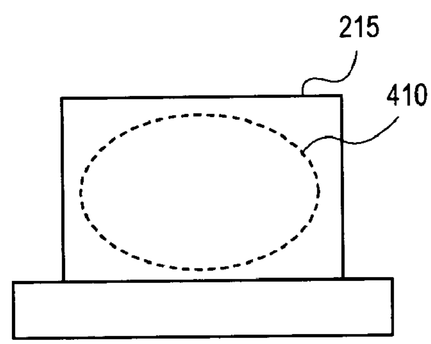
FIG. 4B is a cross-sectional diagram of a unitary section of a branch waveguide illustrating an intensity distribution of an input optical signal propagating along the unitary section, in accordance with an embodiment of the present invention.

FIG. 4B is a cross-sectional diagram of unitary section 215 illustrating intensity distribution 410 propagating along unitary section 215, in accordance with an embodiment of the present invention. As can be seen, intensity distribution 410 of input optical signal 205 is confined to a single-mode within unitary section 215.

FIG. 4C is a diagram illustrating propagation of input optical signal 205 within offset section 225, in accordance with an embodiment of the present invention. As illustrated, input optical signal 205 expands laterally within offset section 225, such that the second order mode or double mode of input optical signal 205 is supported by offset section 225. However, lateral dimension $W_2$ of offset section 225 is small enough to cutoff higher order modes. Thus, applying the boundary conditions present within offset section 225 provides a solution to Equation 1 whereby E-field 415 of input optical signal 205 includes a peak and a valley. Intensity distribution 420 is proportional to the square of E-field 415.

FIG. 4D is a cross-sectional diagram of offset section 225 illustrating intensity distribution 420 of E-field 415 propagating along offset section 225, in accordance with an embodiment of the present invention. As can be seen from FIGS. 4C and 4D, E-field 415 has a node at center 275 of offset section 225. Thus, the optical energy of E-field 415 is concentrated off to the sides of offset section 225, as opposed to center 275, as in unitary section 215. Therefore, when input optical signal 205 reaches splitting point 255 of branching waveguide 200, intensity distribution 420 is optimally aligned with branching sections 230A and 230B. FIGS. 4C and 4D illustrate the ideal configuration for achieving optimal split power uniformity and efficient splitting of input optical signal 205 into output optical signals 210A and 210B propagating along branching sections 230A and 230B.

Figure 1:
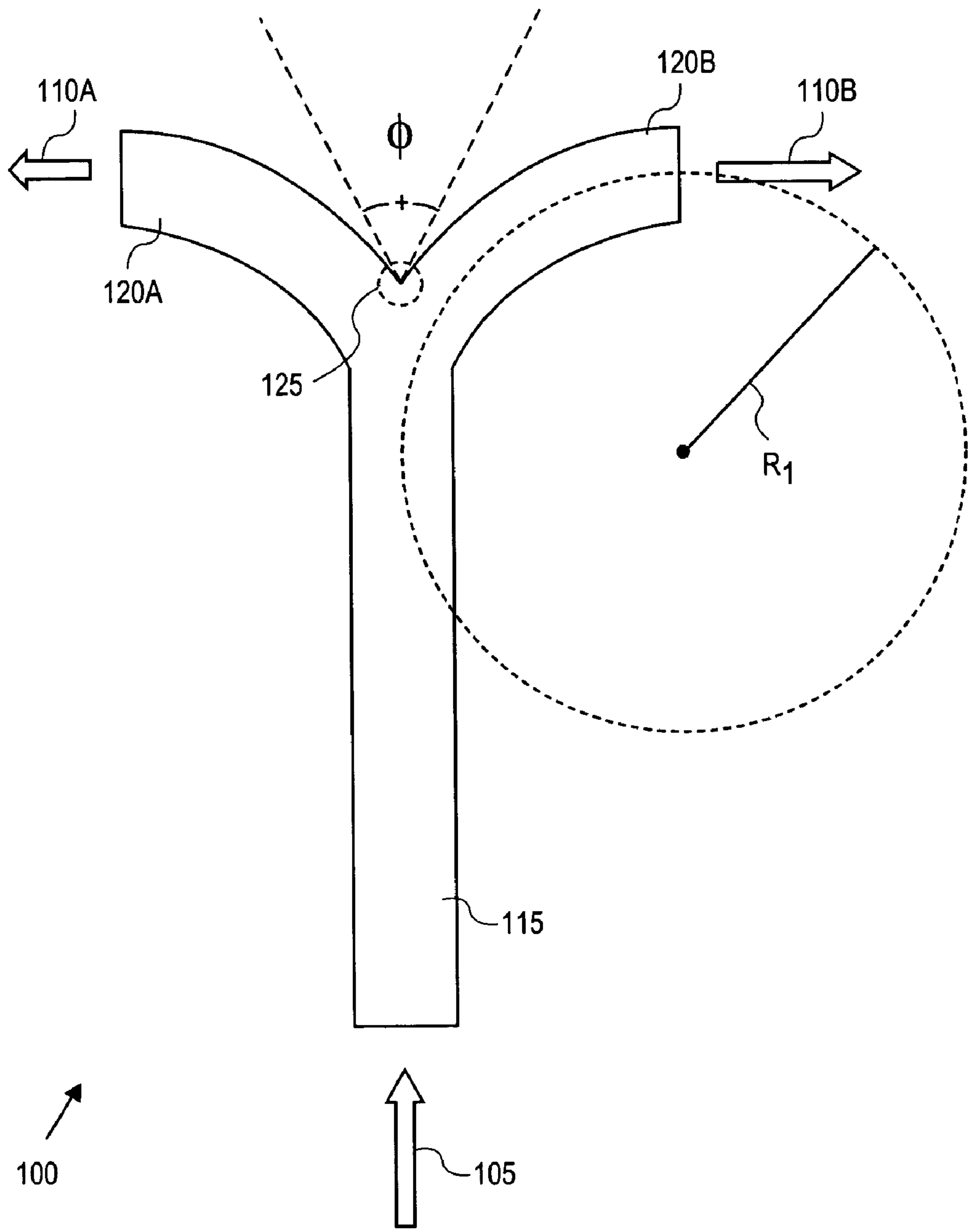
FIG. 1 is a block diagram illustrating a known Y-branch for splitting optical power.
Figure 4E:
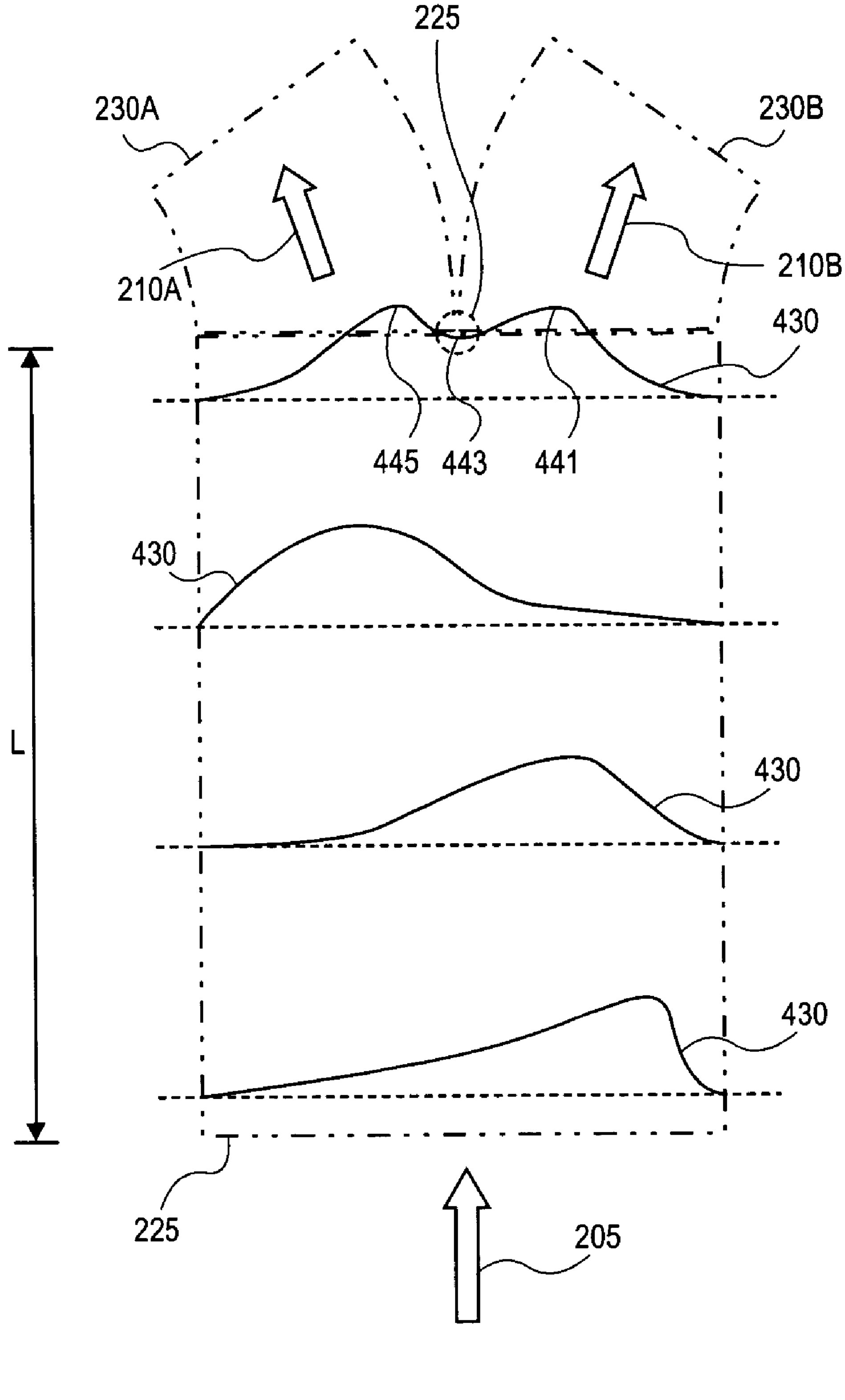
FIG. 4E is a diagram illustrating propagation of an input optical signal along an offset section of a branching waveguide, in accordance with an embodiment of the present invention.

FIG. 4E is a diagram illustrating multimode propagation of input optical signal 205 along offset section 225, in accordance with an embodiment of the present invention. FIG. 4E illustrates the case where both the fundamental mode and the double mode of input optical signal 205 are simultaneously excited along offset section 225. As can be seen, the combination of the two supported propagation modes results in a combined E-field 430 that varies along the length of offset section 225 as input optical signal 205 propagates down offset section 205. In this case, length L of offset section 225 should be designed such that the combination of the fundamental and double modes form an E-field 430 having peaks 441 and 445 spread to the right and to the left of offset section 225 when combined E-field 430 reaches splitting point 225. Although combined E-field 430 is not zero at a valley 443 when combined E-field 430 reaches splitting point 225 (as in the ideal case illustrated in FIGS. 4C and 4D), combined E-field 430 is also not peaked at splitting point 225 as is the case with Y-branch 100 (FIG. 1). Thus, in the case of multimode propagation along offset section 225, branching waveguide 200 produces superior uniform power splitting ratio and efficient coupling over Y-branch 100.

Figure 5:
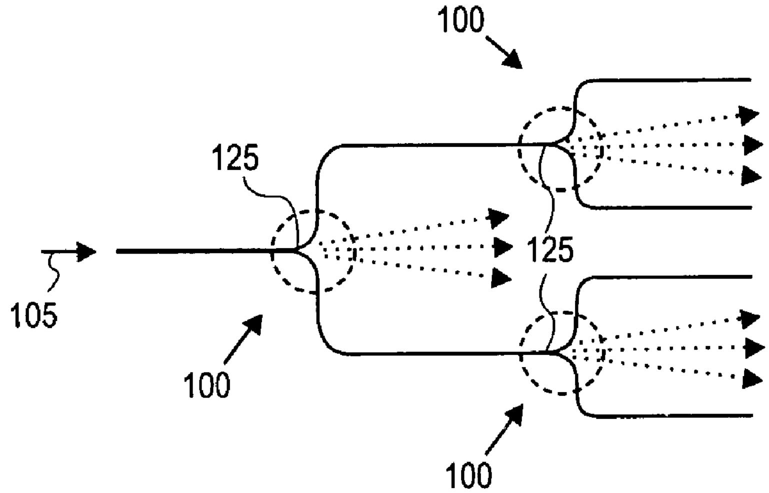
FIG. 5 is a diagram illustrating optical power loss due to light spill out at a splitting point of a known Y-branch.
Figure 6:
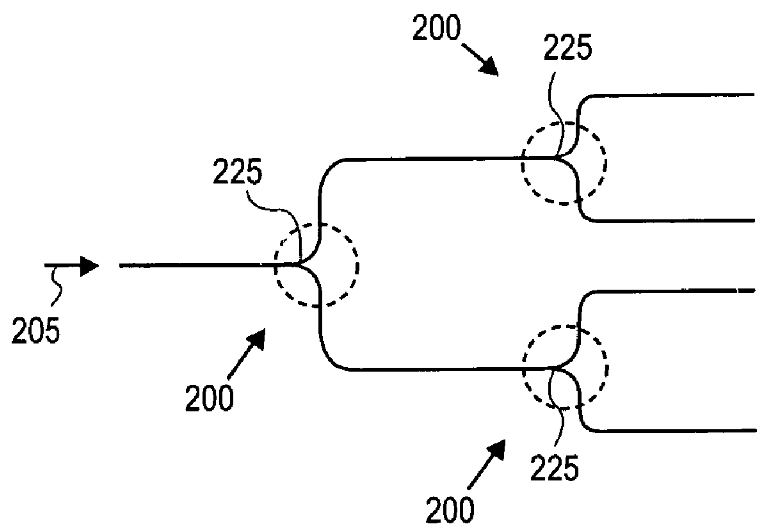
FIG. 6 is a diagram illustrating efficient optical coupling of an input optical signal from a unitary section to branching sections of a branching waveguide, in accordance with an embodiment of the present invention.

Referring to FIGS. 5 and 6, Y-branches 100 result in greater optical power loss than branching waveguides 200. The greater optical power loss resulting from Y-branch 100 is due to light spill out at splitting points 125. As discussed above, light spill out occurs, in part, because input optical signal 105 has an E-field maximum at splitting point 125. In contrast, branching waveguides 200 lose very little optical power due to spill out at splitting points 225. As can been seen from FIG. 5, a considerable amount of optical power can be lost due to light spill out when an optical device is fashioned with multiple levels of Y-branches 100.

Figure 7:
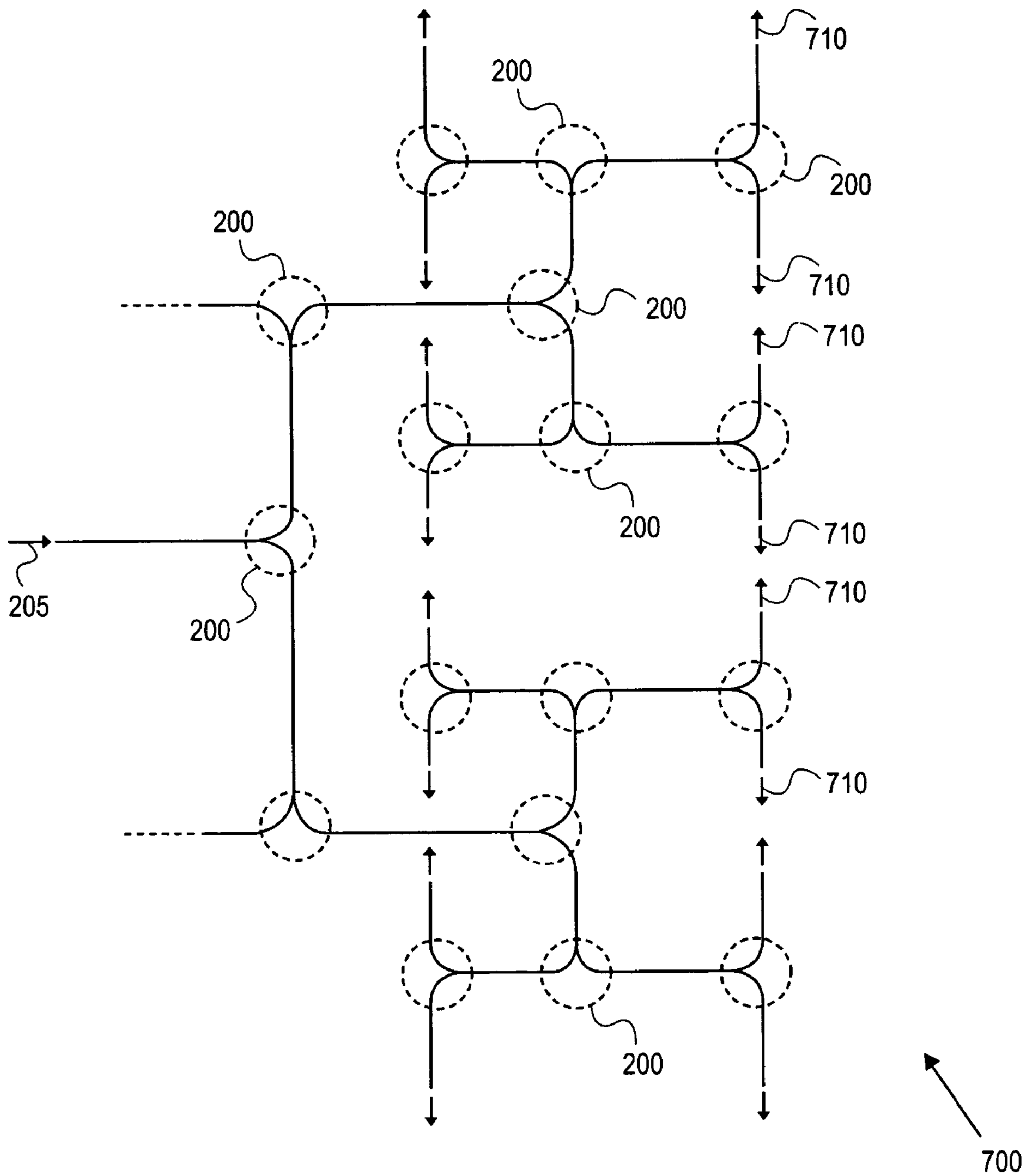
FIG. 7 is a diagram illustrating multi-fanout "H-Tree" using a plurality of branching waveguides to efficiently and uniformly split an input optical signal, in accordance with an embodiment of the present invention.

FIG. 7 is a diagram illustrating a multi-fanout H-tree 700 using a plurality of branching waveguides 200 to efficiently and uniformly split input optical signal 205 multiple times, in accordance with an embodiment of the present invention. As can be seen from FIG. 7, input optical signal 205 can be split into N output optical signals 710 using N−1 branching waveguides 200. It should be appreciated that any non-uniform split ratio in branching waveguides 200 could be magnified with successive levels of branching waveguides 200, such that output optical signals 710 are considerably non-uniform in power. Thus, the uniform splitting characteristic of branching waveguides 200 makes them particularly suitable for use with multi-fanout H-trees.

Figure 8A:
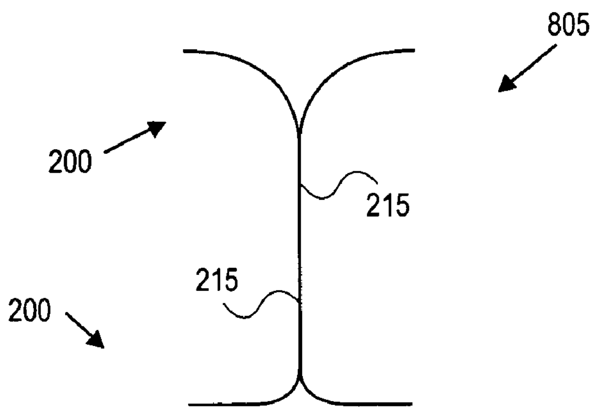
FIG. 8A is a diagram illustrating an example 2×2 optical coupler employing branching waveguides, in accordance with an embodiment of the present invention.
Figure 8B:
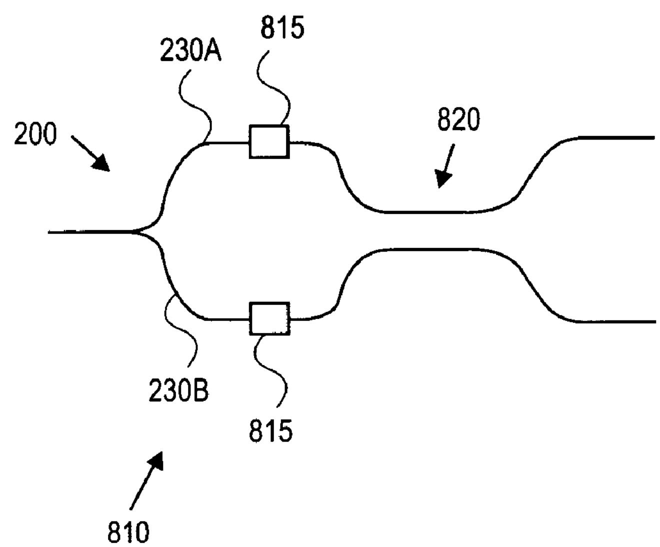
FIG. 8B is a diagram illustrating an example 1×2 optical switch employing a branching waveguide, in accordance with an embodiment of the present invention.
Figure 8C:
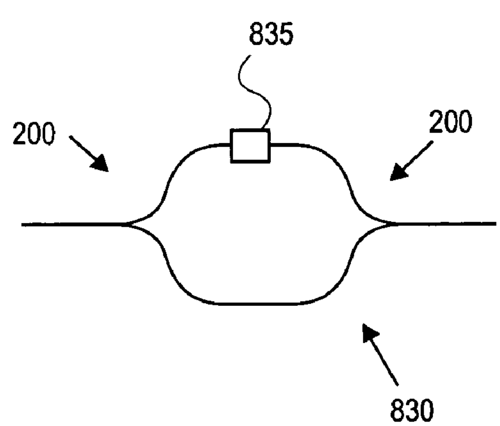
FIG. 8C is a diagram an optical switch or variable optical attenuator employing opposing branching waveguides, in accordance with an embodiment of the present invention.

It should be appreciated that embodiments of branching waveguide 200 are not limited for use as an isolated Y-branch or as a building block for multi-fanout H-tree 700; rather, branching waveguide 200 may be a subcomponent or building block used in any number of optical devices. For example, FIG. 8A illustrates how embodiments of branching waveguide 200 may be employed as a building block of a 2×2 optical coupler 805 wherein unitary sections 215 of two branching waveguides 200 are optically coupled inline with each other. FIG. 8B illustrates an example of a 1×2 optical switch 810 wherein optical phase shifters 815 are coupled inline with each of branching sections 230A and 230B to induce a phase difference between output optical signals 260A and 260B. The branching sections are subsequently brought back beside each other to enable evanescent coupling over an interaction segment 820. FIG. 8C illustrates an example of an optical switch 830 (or variable optical attenuator) formed of two opposing branching waveguides 200 having their branching sections optically coupled together with a phase shifter 835 provided in between one of the two sets of branching sections. Other uses for branching waveguide 200 will be apparent to those of ordinary skill in the art.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An optical apparatus, comprising:

an unitary waveguide section having a first lateral dimension perpendicular to a propagation axis;

a offset waveguide section optically coupled to the unitary waveguide section, the offset waveguide section having a second lateral dimension approximately equal to twice the first lateral dimension, wherein the second lateral dimension of the offset waveguide section is substantially constant over a length parallel to the propagation axis; and two branching waveguide sections each having first ends and second ends, the first ends optically coupled to the offset section, wherein the length parallel to the propagation axis of the offset waveguide section is selected such that an optical signal propagating through the offset waveguide section includes two peaks offset about a center of the offset waveguide section when the optical signal reaches the first ends of the two branching wave guide sections.

2. The optical apparatus of claim 1 wherein the two branching waveguide sections are approximately tangent to each other at a splitting point of the first ends and diverge at the second ends.

3. The optical apparatus of claim 2 wherein a first center of the first lateral dimension of the unitary waveguide section is substantially aligned with a second center of the second lateral dimension of the offset waveguide section.

4. The optical apparatus of claim 1 wherein the unitary waveguide section comprises a single mode waveguide section.

5. The optical apparatus of claim 1 wherein the offset waveguide section supports propagation of a double mode of the optical signal.

6. The optical apparatus of claim 5 wherein the offset waveguide section supports simultaneous propagation of a fundamental mode and the double mode of the optical signal.

7. The optical apparatus of claim 6 wherein the offset waveguide section has a length parallel to the propagation axis such that a combined electric field of the fundamental mode and the double mode of the optical signal has two peaks offset about a center of the offset section when the optical signal reaches the first ends of the two branching waveguide sections.

8. The optical apparatus of claim 1 wherein the unitary waveguide section, the offset waveguide section, and the two branching waveguide sections have substantially rectangular cross-sections.

9. The optical apparatus of claim 1 wherein a transition between the unitary waveguide section and the offset waveguide section is abrupt.

10. The optical apparatus of claim 1 wherein a transition between the unitary waveguide section and the offset waveguide section is gradual.

11. The optical apparatus of claim 1 wherein the two branching waveguide sections comprise single mode waveguides each having a third lateral dimension approximately equal to the first lateral dimension of the unitary waveguide section.

12. A method, comprising:

propagating an optical signal having a single mode of propagation along a first waveguide section;

expanding the optical signal to a multimode optical signal propagating along a second waveguide section having a substantially constant lateral dimension alone a length parallel to a propagation axis through the second waveguide section; and splitting the multimode optical signal, at a location where the multimode optical signal has two electric field peaks offset from a center of the second waveguide section, into two separate optical signals propagating along branching waveguide sections.

13. The method of claim 12 wherein expanding the optical signal to the multimode optical signal comprises transitioning the first waveguide section to the second waveguide section, wherein the substantially constant lateral dimension of the second waveguide section is approximately equal to twice a first lateral dimension of the first waveguide section.

14. The method of claim 13 wherein transitioning the first waveguide section to the second waveguide section comprises an abrupt transition.

15. The method of claim 13 wherein transitioning the first waveguide section to the second waveguide section comprises a gradual transition.

16. The method of claim 13 wherein the multimode optical signal includes a single mode of propagation and a double mode of propagation simultaneously.

17. The method of claim 12 wherein splitting the multimode optical signal comprises splitting the multimode optical signal into the two separate optical signals at a splitting point defined by approximately tangent waveguide walls of the branching waveguide sections.

18. The method of claim 12 wherein the two separate optical signals propagating along the branching waveguide sections have substantially equal optical power.

19. A system, comprising:

a plurality of branching waveguides, each branching waveguide comprising:

a unitary waveguide section having a first lateral dimension perpendicular to a propagation axis;

an offset waveguide section optically coupled to the unitary waveguide section, the offset waveguide section having a second lateral dimension approximately equal to twice the first lateral dimension, wherein the second lateral dimension of the offset waveguide section is substantially constant over a length parallel to the propagation axis; and two branching waveguide sections having first ends and second ends, the first ends optically coupled to the offset section, wherein the length parallel to the propagation axis of the offset waveguide section is selected such that an optical signal propagating through the offset waveguide section includes two peaks offset about a center of the offset waveguide section when the optical signal reaches the first ends of the two branching waveguide sections, wherein the unitary waveguide section of each of the plurality of branching waveguides is optically coupled to one of the two branching waveguide sections of another of the plurality of branching waveguides.

20. The system of claim 19 wherein the plurality of branching waveguides comprise a plurality of Y-branch waveguides.

21. The system of claim 20 wherein the plurality of Y-branch waveguides comprises a multi-fanout “H-Tree”.

22. The system of claim 19 wherein the two branching waveguide sections are approximately tangent to each other at a splitting point of the first ends and diverge at the second ends.

23. The optical apparatus of claim 19 wherein the unitary waveguide section comprises a single mode waveguide section.

24. The optical apparatus of claim 23 wherein the offset waveguide section supports propagation of an optical signal having a double mode.

25. The optical apparatus of claim 24 wherein the offset waveguide section comprises a multimode waveguide section that supports propagation of an optical signal including a fundamental mode and the double mode.

26. The optical apparatus of claim 1 wherein the unitary waveguide section, the offset waveguide section, and the two branching waveguide sections comprise a silicon-on-insulator (“SOI”) structure.

27. The method of claim 12, wherein the first waveguide section, the second waveguide section, and the branching waveguide sections comprise a silicon-on-insulator (“SOI”) structure.

* * * * *